(12) United States Patent
Lin et al.

(10) Patent No.: US 8,056,850 B2
(45) Date of Patent: Nov. 15, 2011

(54) PARTICLE-FILLED WING-TO-BODY FAIRING AND METHOD FOR REDUCING FAIRING VIBRATIONS

(75) Inventors: Juhn-Shyue Lin, Renton, WA (US); Herbert L. Hoffman, Seattle, WA (US); Gary R. Chewning, Woodinville, WA (US); Melvin Kosanchick, III, Woodinville, WA (US); Hugh Poling, Seattle, WA (US)

(73) Assignee: The Boeing Company, Chicago, IL (US)

( * ) Notice: Subject to any disclaimer, the term of this patent is extended or adjusted under 35 U.S.C. 154(b) by 608 days.

(21) Appl. No.: 12/016,741

(22) Filed: Jan. 18, 2008

(65) Prior Publication Data

US 2009/0184206 A1 Jul. 23, 2009

(51) Int. Cl.
*B64C 7/00* (2006.01)
(52) U.S. Cl. .................... 244/1 N; 244/119; 244/130
(58) Field of Classification Search ............... 244/1 N, 244/119, 133, 130; 181/292–294
See application file for complete search history.

(56) References Cited

U.S. PATENT DOCUMENTS

| | | | |
|---|---|---|---|
| 3,976,269 A | 8/1976 | Gupta | |
| 4,557,961 A * | 12/1985 | Gorges | 428/117 |
| 4,635,882 A | 1/1987 | SenGupta et al. | |
| 4,674,712 A * | 6/1987 | Whitener et al. | 244/119 |
| 4,687,691 A | 8/1987 | Kay | |
| 4,828,202 A | 5/1989 | Jacobs et al. | |
| 5,542,626 A * | 8/1996 | Beuck et al. | 244/119 |
| 5,851,626 A | 12/1998 | McCorry et al. | |
| 5,876,023 A | 3/1999 | Hain et al. | |
| 5,895,013 A * | 4/1999 | Towfiq | 244/119 |
| 6,065,717 A * | 5/2000 | Boock | 244/1 N |
| 6,179,086 B1 * | 1/2001 | Bansemir et al. | 181/292 |
| 6,237,602 B1 | 5/2001 | Nickels et al. | |
| 6,267,838 B1 * | 7/2001 | Saugnac et al. | 181/292 |
| 6,547,049 B1 | 4/2003 | Tomlinson | |
| 6,595,509 B2 | 7/2003 | Sesek | |
| 6,609,592 B2 | 8/2003 | Wilson | |
| 6,736,423 B2 | 5/2004 | Simonian et al. | |
| 6,851,515 B2 * | 2/2005 | Dussac et al. | 181/292 |
| 6,920,958 B2 | 7/2005 | Harrison | |
| 6,983,821 B2 * | 1/2006 | Putt et al. | 181/294 |
| 7,407,135 B2 | 8/2008 | Rouyre | |
| 7,419,031 B2 | 9/2008 | Liguore et al. | |
| 2002/0166721 A1 | 11/2002 | Monson et al. | |
| 2005/0194210 A1 * | 9/2005 | Panossian | 181/293 |

(Continued)

FOREIGN PATENT DOCUMENTS

JP 11044015 2/1997

OTHER PUBLICATIONS

Non-Obstructive Particle Damping (NOPD) Treatment Optimization for Composite Honeycomb Panels, 48th AIAA/ASME/ASCE/AHS/ASC Structures, Structural Dynamics, and Materials Conference Apr. 23-26, 2007, Honolulu, Hawaii.

(Continued)

*Primary Examiner* — Galen Barefoot
(74) *Attorney, Agent, or Firm* — Tung & Associates

(57) ABSTRACT

A wing-to-body fairing for reducing noise due to wing-to-body fairing vibrations in an aircraft, spacecraft, or vehicle may include a honeycomb center having a cavity which is at least partially filled with particle material.

25 Claims, 4 Drawing Sheets

U.S. PATENT DOCUMENTS

2006/0065784 A1* 3/2006 Rouyre .................. 244/119
2008/0277057 A1 11/2008 Montgomery et al.

OTHER PUBLICATIONS

H.V. Panossian, "Structural Damping Enhancement Via Non-Obstructive Patricle Damping Technique", Journal of Vibration and Acoustics, p. 101-104.

Papalou, A. and Masri S.F., "Response of Impact Dampers with Granular Materials Under Random Excitation", Earthquake Engineering and Structural Dynamics, p. 253-267, (Apr. 15, 1996).

Peeters, et al. Fuel *Efficiency of Commercial Aircraft: An Overview of Historical and Future Trends*, National Aerospace Laboratory report of The Netherlands, NLR-CR-2005-669 (Nov. 2005).

* cited by examiner

PARTICLE-FILLED WING-TO-BODY FAIRING AND METHOD FOR REDUCING FAIRING VIBRATIONS

BACKGROUND

Spacecraft, aircraft, and other vehicles often experience substantial vibrations, noise, and fatigue in fairings and in particularly wing-to-body fairings which are attached between the wings and body of the spacecraft, aircraft, or vehicle. Some of the previous prior art devices may have involved heavy, complex, excessive part, and/or expensive noise and vibration dampening devices in an effort to attempt to reduce vibrations, noise, and fatigue. However, many of these prior art devices do not sufficiently reduce noise, vibration, and/or fatigue, and/or may lead to increased weight, increased complexity, an increased number of parts, an increased cost, and/or experience other types of issues.

A wing-to-body fairing, and a method of use thereof, is needed to decrease one or more problems associated with one or more of the existing wing-to-body fairings and/or methods of use thereof.

SUMMARY

In one aspect of the disclosure, a fairing for reducing noise due to fairing vibrations in at least one of an aircraft and a spacecraft may comprise a honeycomb center comprising a cavity which is at least partially filled with particle material, and a plurality of layers surrounding the honeycomb center. The fairing may comprise a wing-to-body fairing, sometimes also called wing to fuselage or fillet panels.

In another aspect of the disclosure, a method of reducing fairing vibrations in at least one of an aircraft and a spacecraft may be provided. In one step, a wing-to-body fairing may be provided comprising a honeycomb center having a cavity. In another step, the cavity may be at least partially filled with particle material. In an additional step, the honeycomb center may be surrounded with a plurality of layers. In yet another step, the wing-to-body fairing may be attached to a wing and a body of at least one of an aircraft and a spacecraft.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
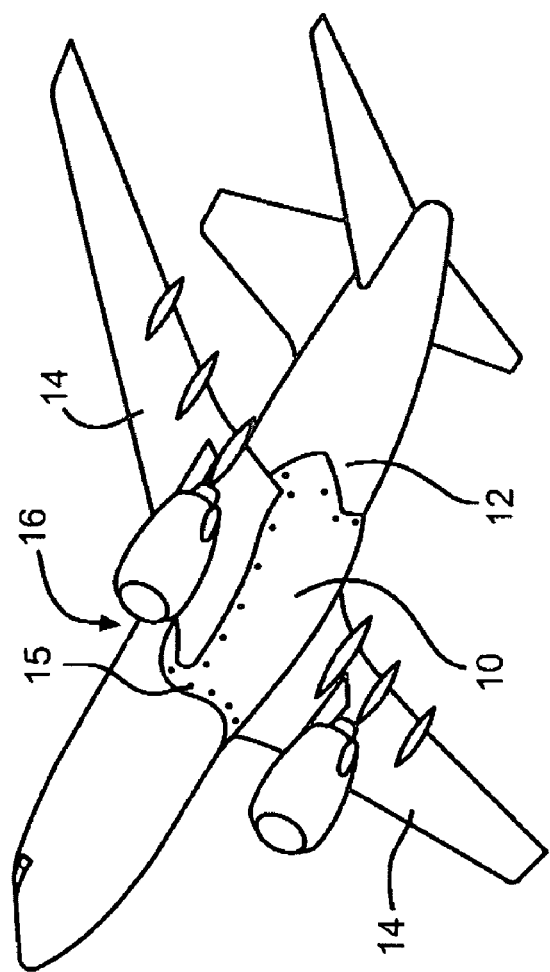
FIG. 1 shows a bottom perspective view of one embodiment of a wing-to-body fairing attached between a body and wing of an aircraft.
Figure 2:
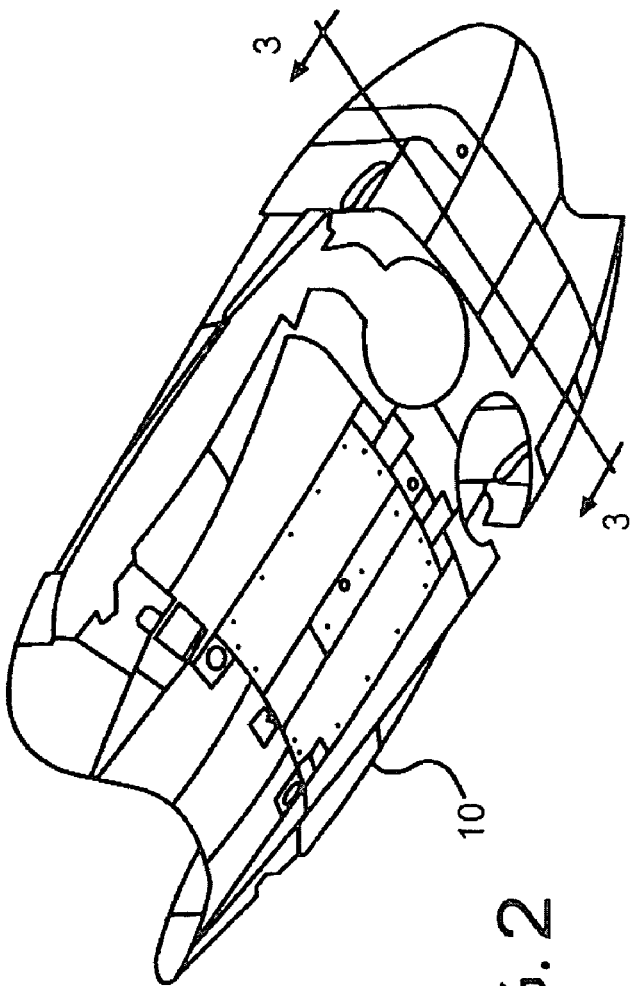
FIG. 2 shows a bottom perspective view of the wing-to-body fairing of FIG. 1 separated from the aircraft.
Figure 3:
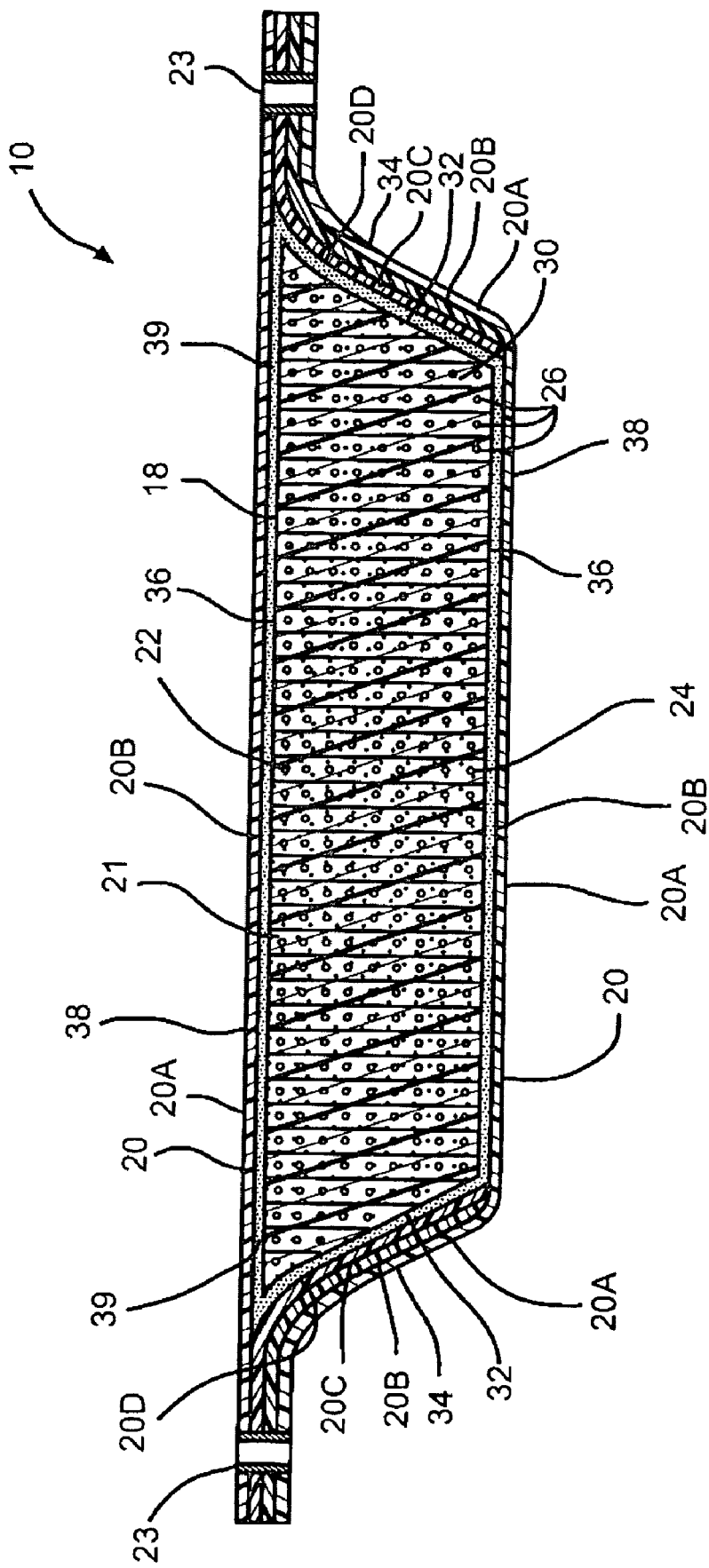
FIG. 3 shows a cross-section view along line 3-3 of the embodiment of FIG. 2.

FIG. 1 shows a bottom perspective view of one embodiment of a wing-to-body fairing 10 attached between a body 12 and wing 14 of an aircraft 16. The wing-to-body fairing 10 may be attached between the wing 14 and body 12 utilizing fasteners 15 and other attachment mechanisms. The aircraft 16 may comprise a plane, spacecraft, and/or other type of vehicle. FIG. 2 shows a bottom perspective view of the wing-to-body fairing 10 of FIG. 1 separated from the aircraft 16. FIG. 3 shows a cross-section view along line 3-3 of the embodiment of FIG. 2.

As shown in FIG. 3, the wing-to-body fairing 10 may comprise a honeycomb center 18 sandwiched between a plurality of layers 20 which surround the honeycomb center 18. The honeycomb center 18 may comprise a honeycomb core 21. The honeycomb center 18 may be made of one or more of Aluminum, Nomex, Metal, Cotton, a composite, or other types of materials. The core 21 may be defined by a cavity 22. The cavity 22 may comprise an open cell pattern 24. The cavity 22 may be at least partially filled with particle material 26. The particle material 26 may comprise at least one of Volcanic Ash, Plastic, Perlite, Sodium-Potassium, and Aluminum-Silicate. In other embodiments, the particle material 26 may be made of varying materials. The particle material 26 may comprise a plurality of particles, wherein each particle has a size in a range of 1 to 300 micro meter. In one embodiment, 60 to 90 percent of the cavity 22 may be filled with particle material 26. In another embodiment, 70 to 80 percent of the cavity 22 may be filled with particle material 26. In other embodiments, varying amounts of the cavity 22 may be filled with particle material 26. The particle material 26 may be moveably disposed within the cavity 22 in order to transform kinetic energy into heat in order to reduce noise and vibrations in the frequency range of less than 400 Hz. The particle material 26 may have been sprayed into the cavity 22. In still other embodiments, the honeycomb center 18 may comprise varying types, sizes, materials, configurations, and orientations.

The honeycomb center 18 may be in the shape of the wing-to-body fairing 10. The plurality of layers 20 surrounding the honeycomb center 18 may be made of Fiberglass or other materials. Cylindrical bushing inserts 23 may extend between the plurality of layers 20 to provide additional support. Four layers 20A, 20B, 20C, and 20D may surround a curved and/or angled portion 32 of the honeycomb center 18 to form a curved and/or angled portion 34 of the wing-to-body fairing 10. Two layers 20A and 20B may surround a linear portion 36 of the honeycomb center 18 to form a linear portion 38 of the wing-to-body fairing 10. In other embodiments, between two to five layers 20 may surround various portions of the honeycomb center 18. In still other embodiments, any number of layers 20 may surround differing portions of the honeycomb center 18. The honeycomb center 18 may be attached to the plurality of layers 20 utilizing glue 39, another type of adhesive, or other attachment mechanism.

The wing-to-body fairing 10 which is at least partially filled with particle material 26 may be used to reduce cabin noise due to vibrations between the body 12 and wing 14 of the aircraft 16 by providing a fairing 10 which is more resistant to vibration and noise. The wing-to-body fairing 10 which is at least partially filled with particle material 26 may reduce noise/vibrations effectively in the frequency range below 400 Hz. The wing-to-body fairing 10 which is at least partially filled with particle material 26 may further reduce fatigue by providing a fairing 10 which is more fatigue resilient. In other embodiments, the wing-to-body fairing 10 which is at least partially filled with particle material 26 may be used to reduce noise, to reduce vibration, and/or to reduce fatigue in another type of vehicle such as a spacecraft. Embodiments may be used in the fabrication of fairings other than the wing-to-fuselage fairing, such as in other areas where noise, fatigue, and vibration may be reduced.

Figure 4:
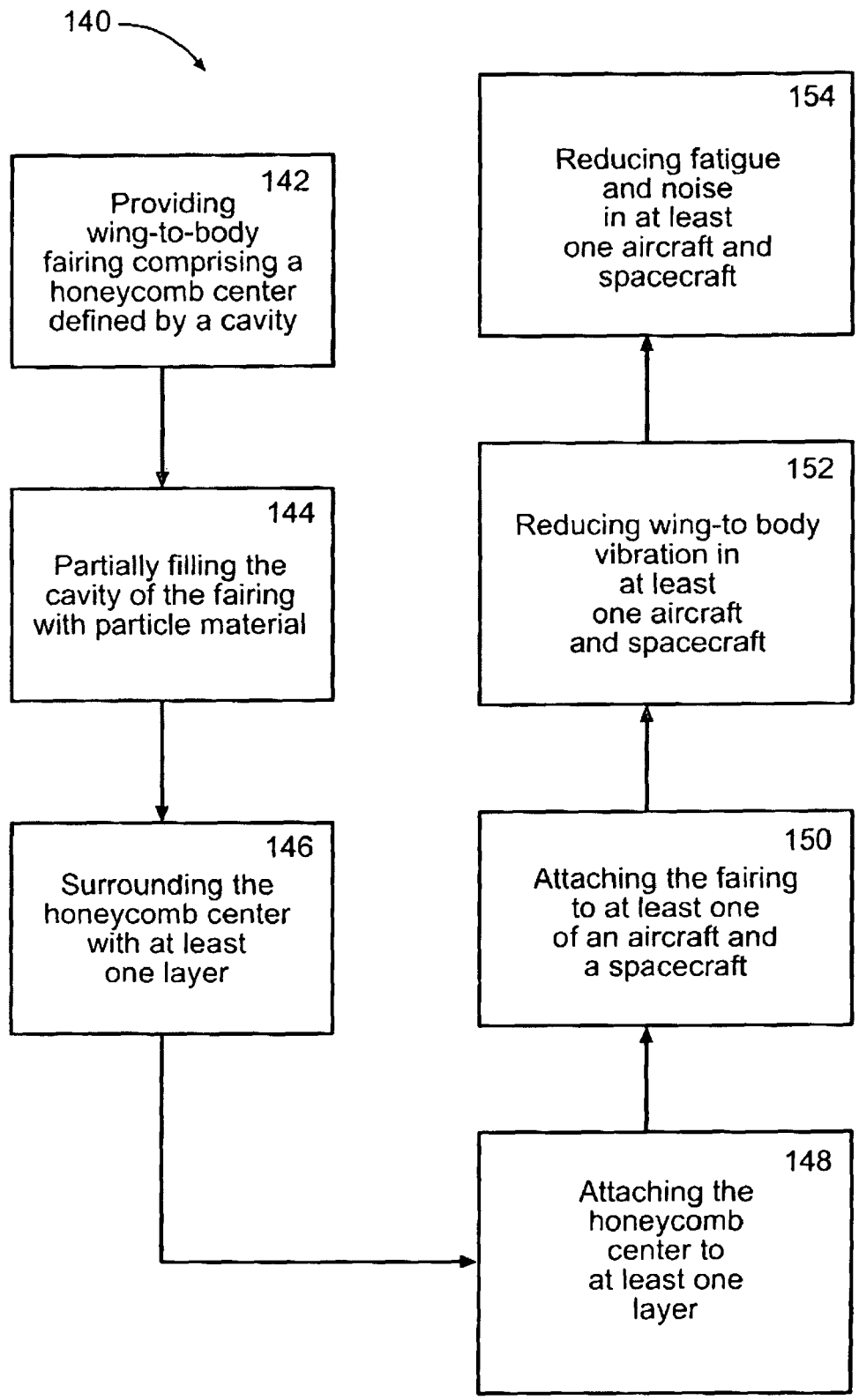
FIG. 4 shows a flowchart of one embodiment of a method of reducing wing-to-body fairing vibrations in at least one of an aircraft and a spacecraft.

FIG. 4 is a flowchart showing one embodiment of a method 140 of reducing wing-to-body fairing vibrations in at least one of an aircraft and a spacecraft 16. In one step 142, a wing-to-body fairing 10 may be provided comprising a honeycomb center 18 comprising a core 21 defined by a cavity 22. The cavity 22 may comprise an open cell pattern 24. The wing-to-body fairing 10 may be at least partially curved and/or angled. The wing-to-body fairing 10 may comprise a plurality of layers 20 which may be made of Fiberglass or other materials. In one embodiment, between two to five layers 20 may be utilized. In other embodiments, varying numbers of layers 20 may be used. In still other embodiments, the wing-to-body fairing 10 may comprise any of the embodiments disclosed herein.

In another step 144, the cavity 22 may be at least partially filled with particle material 26. Step 144 may comprise spraying particle material 26 into the cavity 22. The particle material 26 may comprise at least one of Volcanic Ash, Plastic, Perlite, Sodium-Potassium, and Aluminum-Silicate. In other embodiments, the particle material 26 may be made of varying materials. The particle material 26 may comprise a plurality of particles, wherein each particle has a size in a range of 1 to 300 micro meter. In one embodiment, step 144 may comprise filling 60 to 90 percent of the cavity 22 with particle material 26. In another embodiment, step 144 may comprise filling 70 to 80 percent of the cavity 22 with particle material 26. In other embodiments, step 144 may comprise filling varying amounts of the cavity 22 with particle material 26.

In still another step 146, the honeycomb center 18 may be enclosed/surrounded within at least one layer 20, also called face sheets. In an additional step 148, the honeycomb center 18 may be attached to the at least one layer 20 or ply utilizing glue; adhesive, or other attachment mechanisms. The layers 20 or plies may be arranged in varying ply orientations. For instance, 0, 30, 60, 90 and/or 0, 45, 90 and the at least one layer 20 may be made from material suitable for conveying the energy from a lightening strike from the fairing 10 to the surrounding structure. In yet another step 150, the wing-to-body fairing 10, also known as a wing to fuselage fairing, may be attached to a wing 14 and a body 12 of at least one of an aircraft and a spacecraft 16 utilizing adhesive, fastening, or another attachment mechanism.

In still another step 152, wing-to-body vibrations in the at least one aircraft and spacecraft 16 may be reduced due to the attached wing-to-body fairing 10 which is at least partially filled with particle material 26. Step 152 may comprise moving the particle material 26 within the cavity 22 to transform kinetic energy into heat to reduce wing-to-body vibrations in the at least one aircraft and spacecraft 16. The wing-to-body vibrations which are reduced may have a frequency of less than 400 Hz. In other embodiments, the wing-to-body vibrations which are reduced may have varying frequencies. In yet another step 154, fatigue and noise in the at least one aircraft and spacecraft 16 may be reduced due to the attached wing-to-body fairing which is at least partially filled with particle material 26. Step 154 may comprise moving the particle material 26 within the cavity 22 to transform kinetic energy into heat to reduce fatigue and noise in said at least one aircraft and spacecraft 16.

One or more embodiments of the disclosure may reduce and/or eliminate one or more problems of one or more of the existing fairings, and in particular the wing-to-body fairing, and/or methods of use. For instance, one or more embodiments of the disclosure may reduce wing-to-body fairing vibrations, noise, and/or fatigue as a result of using the at least partially particle material 26 filled honeycomb center 18.

Figure 5:
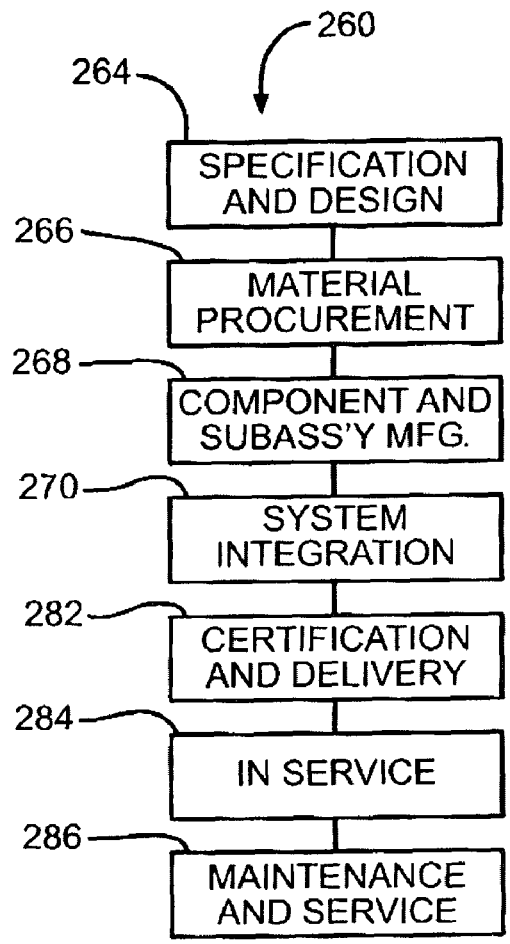
FIG. 5 is a flow diagram of aircraft production and service methodology.
Figure 6:
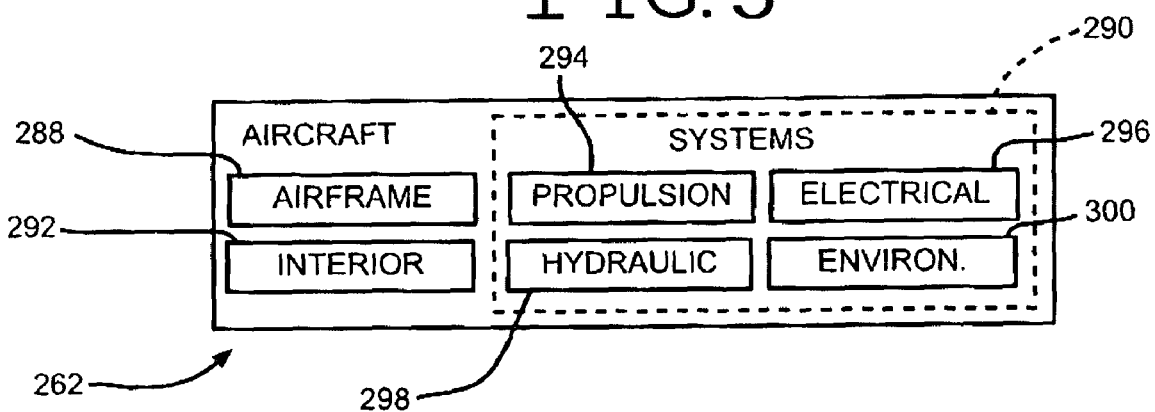
FIG. 6 is a block diagram of an aircraft.

Referring more particularly to the drawings, embodiments of the disclosure may be described in the context of an aircraft manufacturing and service method 260 as shown in FIG. 5 and an aircraft 262 as shown in FIG. 6. During pre-production, exemplary method 260 may include specification and design 264 of the aircraft 262 and material procurement 266. During production, component and subassembly manufacturing 269 and system integration 270 of the aircraft 262 takes place. Thereafter, the aircraft 262 may go through certification and delivery 282 in order to be placed in service 284. While in service by a customer, the aircraft 262 is scheduled for routine maintenance and service 286 (which may also include modification, reconfiguration, refurbishment, and so on).

Each of the processes of method 260 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 262 produced by the exemplary method 260 may include an airframe 288 with a plurality of systems 290 and an interior 292. Examples of high-level systems 290 include one or more of a propulsion system 294, an electrical system 296, a hydraulic system 298, and an environmental system 300. Any number of other systems may be included. Although an aerospace example is shown, the principles of the invention may be applied to other industries, such as the automotive industry.

Apparatus and methods embodied herein may be employed during any one or more of the stages of the production and service method 260. For example, components or subassemblies corresponding to production process 268 may be fabricated or manufactured in a manner similar to components or subassemblies produced while the aircraft 262 is in service. Also, one or more apparatus embodiments, method embodiments, or a combination thereof may be utilized during the production stages 268 and 270, for example, by substantially expediting assembly of or reducing the cost of an aircraft 262. Similarly, one or more apparatus embodiments, method embodiments, or a combination thereof may be utilized while the aircraft 262 is in service, for example and without limitation, to maintenance and service 286.

It should be understood, of course, that the foregoing relates to exemplary embodiments of the disclosure and that modifications may be made without departing from the spirit and scope of the disclosure as set forth in the following claims.

The invention claimed is:

1. A fairing structure for reducing noise due to fairing structure vibrations in at least one of an aircraft and a spacecraft comprising:

said fairing structure disposed between a body of said at least one of an aircraft and a spacecraft and an airfoil projection extending from said body, said fairing structure attached to said body only over an area substantially adjacent to said airfoil;

a honeycomb center comprising a cavity which is at least partially filled with particle material; and a plurality of layers surrounding the honeycomb center.

2. The structure of claim 1 wherein the fairing structure is a wing-to-body fairing.

3. The fairing of claim 1 wherein the cavity comprises an open cell pattern at least partially filled with the particle material.

4. The fairing of claim 1 wherein the particle material comprises at least one of Volcanic Ash, Plastic, Perlite, Sodium-Potassium, and Aluminum-Silicate.

5. The fairing of claim 1 wherein the particle material comprises a plurality of particles, wherein each particle has a size in a range of 1 to 300 micro meter.

6. The fairing of claim 1 wherein the particle material fills in a range of 60 to 90 percent of the cavity.

7. The fairing of claim 1 wherein the honeycomb center comprises at least one of Aluminum, Nomex, Metal, Cotton, and a Composite.

8. The fairing of claim 1 wherein the fairing structure is attached to at least one of an aircraft and a spacecraft for reducing fatigue and noise.

9. The fairing of claim 1 wherein the particle material is moveably disposed within the cavity to transform kinetic energy into heat in order to reduce noise and vibrations in the frequency range of less than 400 Hz.

10. The fairing of claim 1 wherein the plurality of layers comprise Fiberglass layers.

11. The fairing of claim 1 wherein between two to five layers surround the honeycomb center.

12. The fairing of claim 1 wherein the fairing structure is at least one of angled and curved.

13. A method of reducing fairing vibrations in at least one of an aircraft and a spacecraft comprising:

providing a wing-to-body fairing comprising a honeycomb center having a cavity;

at least partially filling said cavity with particle material;

surrounding the honeycomb center with a plurality of layers; and attaching said wing-to-body fairing to a wing and a body of at least one of an aircraft and a spacecraft in order to reduce fairing vibrations, said fairing attached between said wing and said body, said fairing structure attached to said body only over an area substantially adjacent to said airfoil.

14. The method of claim 13 wherein the layers are made of Fiberglass.

15. The method of claim 13 wherein between two to five layers enclose the honeycomb center.

16. The method of claim 13 wherein the provided wing-to-body fairing is at least one of angled and curved.

17. The method of claim 13 further comprising the step of attaching the honeycomb center to the plurality of layers.

18. The method of claim 17 wherein the step of attaching the honeycomb center to the plurality of layers comprises adhering the honeycomb center to the plurality of layers.

19. The method of claim 13 wherein the cavity comprises an open cell pattern, and the step of at least partially filling said cavity with the particle material comprises filling in a range of 60 to 90 percent of the cavity with the particle material.

20. The method of claim 13 wherein the particle material comprises at least one of Volcanic Ash, Plastic, Perlite, Sodium-Potassium, and Aluminum-Silicate.

21. The method of claim 13 wherein the particle material comprises a plurality of particles, wherein each particle has a size in a range of 1 to 300 micro meter.

22. The method of claim 13 wherein the step of attaching said wing-to-body fairing to the wing and to the body comprises at least one of adhering and fastening.

23. The method of claim 13 further comprising the step of moving the particle material within the cavity to transform kinetic energy into heat to reduce wing-to-body vibrations in said at least one aircraft and spacecraft.

24. The method of claim 23 wherein the reduced wing-to-body vibrations have a frequency of less than 400 Hz.

25. The method of claim 13 further comprising the step of moving the particle material within the cavity to transform kinetic energy into heat to reduce fatigue and noise in said at least one aircraft and spacecraft.

* * * * *